(No Model.) 3 Sheets—Sheet 1.
E. A. NEWMAN.
ANTI FREEZING APPARATUS FOR WATER PIPES.
No. 360,107. Patented Mar. 29, 1887.
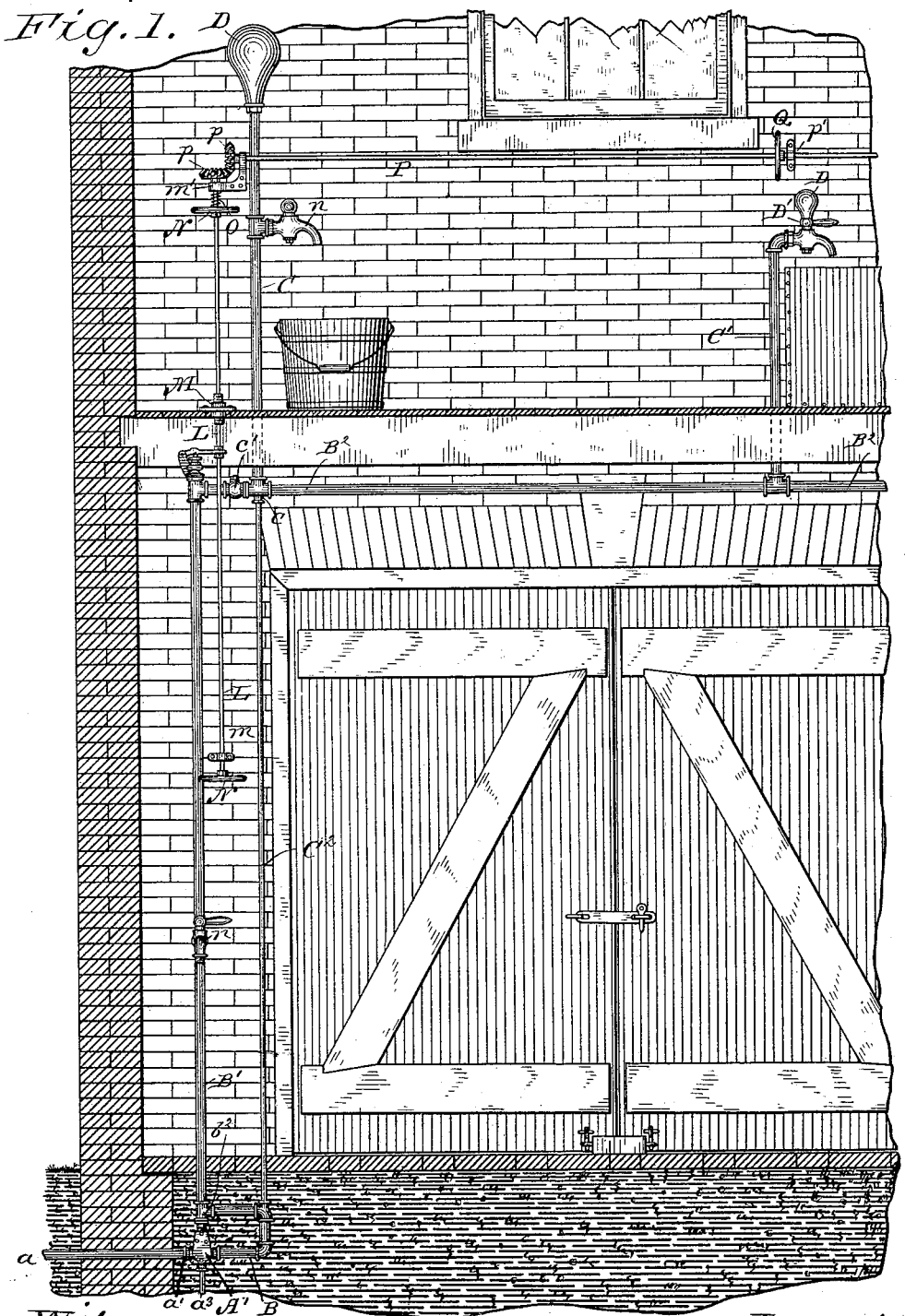
Witnesses
Al. C. Newman
C. M. Newman
Inventor
Edwin A. Newman
By his Attorneys
Baldwin, Hopkins & Peyton

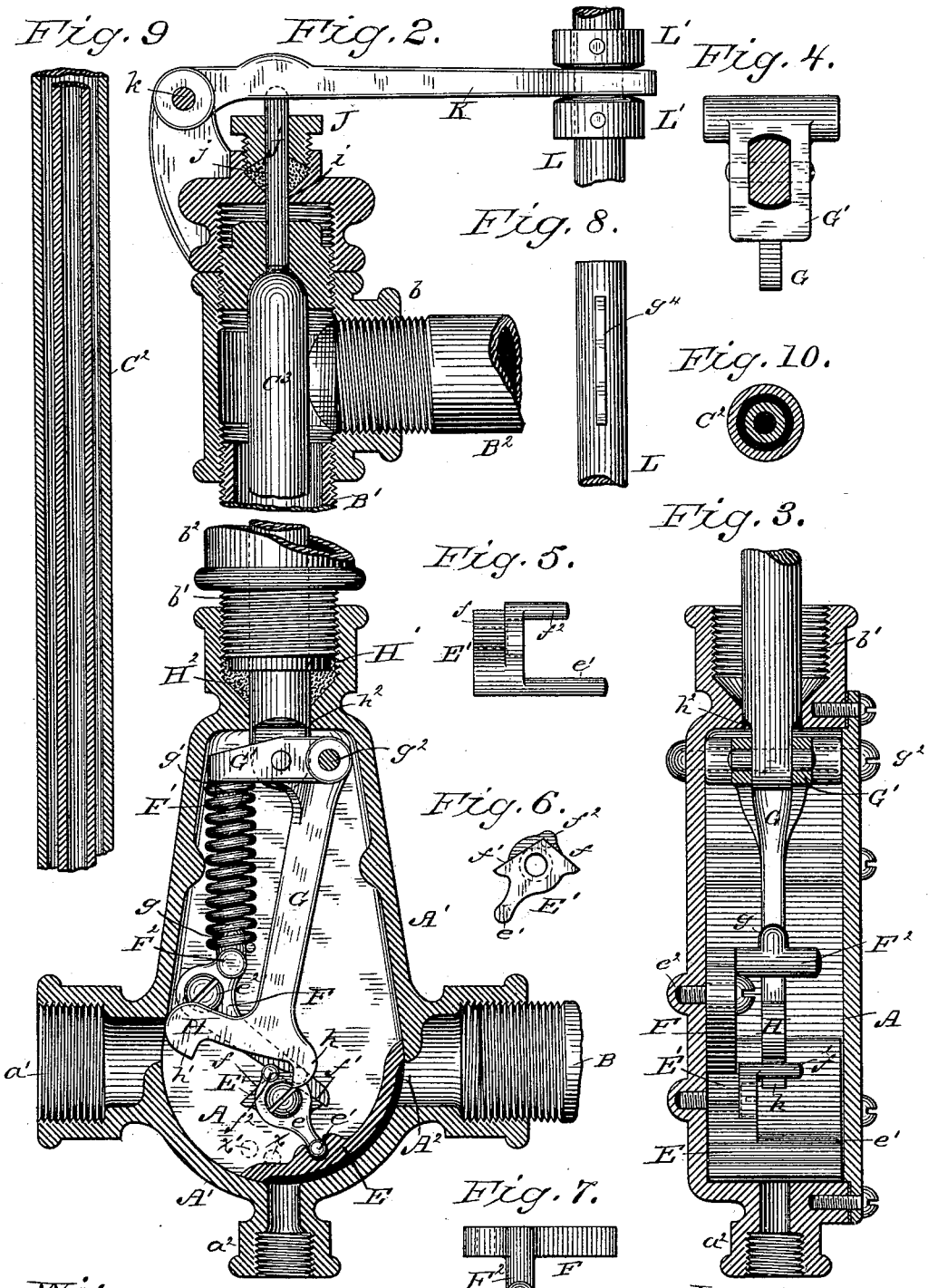

(No Model.) 3 Sheets—Sheet 3.
E. A. NEWMAN.
ANTI FREEZING APPARATUS FOR WATER PIPES.
No. 360,107. Patented Mar. 29, 1887.
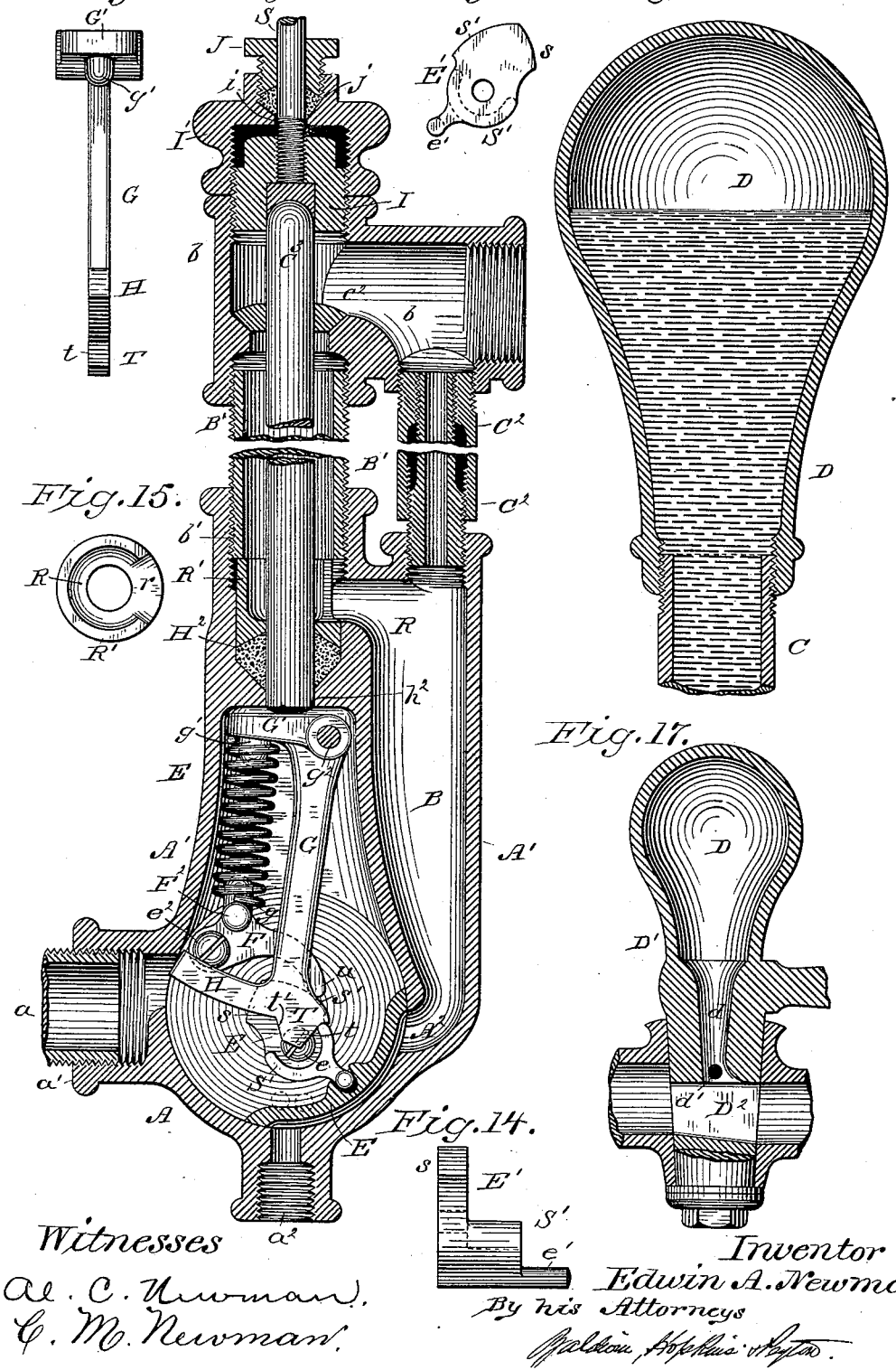
Witnesses
Al. C. Newman
C. M. Newman
Inventor
Edwin A. Newman
By his Attorneys

UNITED STATES PATENT OFFICE.

EDWIN A. NEWMAN, OF WASHINGTON, DISTRICT OF COLUMBIA, ASSIGNOR OF ONE-FOURTH TO DAVID L. SNEDIKER, OF EMPORIA, KANSAS.

ANTI-FREEZING APPARATUS FOR WATER-PIPES.

SPECIFICATION forming part of Letters Patent No. 360,107, dated March 29, 1887.

Application filed August 7, 1886. Serial No. 210,374. (No model.)

*To all whom it may concern:*

Be it known that I, EDWIN A. NEWMAN, of Washington, District of Columbia, have invented certain new and useful Improvements in Anti-Freezing Apparatus for Water-Pipes, of which the following is a specification.

My invention relates to improvements in that class of apparatus for preventing the freezing of water in pipes in which thermostats are employed to automatically actuate mechanism for cutting off the supply of water to the pipes when liable to freeze.

In United States Letters Patent No. 346,308, granted July 27, 1886, for improvements made by me in this class of apparatus there is shown an organization of mechanism by which thermostatic apparatus automatically controls the operations of valve mechanism so as to both cut off and open communication between the source of supply of the water and the pipes to be protected against freezing, and the pipes are automatically emptied when the supply to them is cut off, so that they may contain no water at rest at times during which freezing is possible, while hand-actuated mechanism is provided by which to operate the thermostatic apparatus, in order that by way of this apparatus the supply of water may be turned on temporarily at times when by the automatic operations of the thermostatic apparatus the supply has been cut off, and would, but for this hand-actuated mechanism, remain cut off until a rise of temperature such as to render freezing impossible, when by way of the thermostatic apparatus the valve mechanism is actuated to turn on the water automatically.

By my present improvements I seek to attain the general results designed to be accomplished in accordance with my said patented improvements by the employment of mechanism differing in essential respects therefrom, and by causing the water being supplied to pass in contact with the thermostatic apparatus on its way to the pipes to be protected, thus effecting the working of the thermostatic apparatus by the influence of changes in the temperature of the water instead of the atmosphere.

The subject-matter deemed novel will be pointed out by the claims after describing by the aid of the accompanying drawings a suitable organization of mechanism for carrying out my invention.

Figure 1 is a view in elevation, partly in section, showing portions of a building with its water-service having my improvements. Fig. 2 is a view partly in vertical section and partly in elevation, with parts broken away, showing portions of the thermostatic apparatus, the valve mechanism controlled thereby, the valve-casing, &c. Fig. 3 is a view, partly in elevation and partly in vertical section, at a right angle to Fig. 2, showing the valve mechanism and its casing and the lower end of the thermostatic rod. Fig. 4 is a plan view of the controlling-lever of the valve mechanism with the thermostatic rod in section. Figs. 5 and 6 are elevations, at right angles to each other, of the rocking cam of the valve mechanism. Fig. 7 is a plan view of a spring-actuated lever of the valve mechanism acting upon the rocking cam. Fig. 8 shows in elevation a portion of the turning and endwise-moving rod for operating a lever to actuate the thermostatic apparatus by hand. Figs. 9 and 10 show vertical and horizontal sections of the protected draining-pipe by way of which the pipes are emptied. Fig. 11 is a view, partly in vertical section and partly in elevation, showing modifications of the valve mechanism and valve-casing. Fig. 12 is an elevation of the controlling-lever of the modified valve mechanism. Figs. 13 and 14 are elevations at right angles to each other of the rocking cam of the modified valve mechanism. Fig. 15 is a plan view of a recessed flanged washer for confining packing about the lower end of the thermostatic rod. Fig. 16 is a vertical section showing an air-chamber applied to the upper end of a pipe for expediting the emptying of the pipe when the water is turned off; and Fig. 17 a similar view showing the application of the air-chamber to one of the cocks, by which water is drawn from a pipe.

A more complete explanation of the operation and detailed description of the construction of features not herein claimed and common to both the present and my before-referred to patented apparatus may be had, if needed, by reference to the aforesaid Patent No. 346,308.

My improvements are in this instance shown as applied to the water-service pipes of a building suitable for use as a stable, the water passing from the source of supply by way of the pipe $a$ to the valve-chamber A of a valve-casing, A', buried in the ground, and into the nozzle of the inlet-opening $a'$, of which casing the supply-pipe $a$ is secured. The water issues from the valve-chamber by an outlet-opening, $A^2$, communicating by a suitable water-way, B, with the lower end of a pipe, B', constituting the casing of the thermostatic apparatus, and having communication at its upper end with the main service-pipe $B^2$ of the building by a suitable coupling, $b$.

The thermostatic casing B' is connected at its lower end with the valve-casing by being screwed into the thermostatic coupling-opening $b'$ thereof, and, as shown by Fig. 1 and in part by Fig. 2, the water-way B is formed of short sections of pipe coupled together in U form, one end of this water-way connecting with the outlet-opening $A^2$ and the other communicating with the thermostatic casing by the coupling $b^2$. In addition to the inlet, outlet, and thermostatic coupling openings, the valve-casing is provided with the waste-opening $a^2$, connecting with the waste-pipe $a^3$, for carrying off the water emptied from the main service-pipe $B^2$, and the pipes connected therewith. Two of the pipes, C C', which are connected with the main service-pipe, are shown. (See Fig. 1.) Any desired number may be used. The water may be emptied from the pipes $B^2$ C C' by way of the thermostatic casing; but I prefer to provide a draining-pipe, $C^2$, connected by a coupling, $c$, Fig. 1, at its upper end with the main service-pipe near its connection with the pipe forming the thermostatic casing. At its lower end the draining-pipe communicates by a suitable coupling with the water-way B, which communicates with the valve-chamber and thermostatic casing.

To guard against the freezing of water in the draining-pipe in event of its chilling more rapidly than that in the thermostatic casing, the draining-pipe is suitably protected. As shown, it is incased, an air-space being provided between the pipe and its casing. The capacity of the water-way of the thermostatic casing, combined with that of the draining-pipe, should correspond with or approximately equal that of the main service-pipe, and the capacity of the water-way through the draining-pipe should be sufficiently less than that through the thermostatic casing to insure the the passage of the bulk of the water to and through the latter when flowing to the main service-pipe.

To insure the emptying of the pipes by or mainly by way of the draining-pipe, and thus guard against the untimely actuation of the thermostatic apparatus, which might result from the contact therewith of the water being emptied, in event of its temperature being higher than that of the water brought into contact with the thermostatic apparatus as being supplied to the building, a suitable check-valve is provided to prevent the backflow of the water, or any considerable portion thereof, by way of the thermostatic casing. This check-valve may be located in the main service-pipe at $c'$, Fig. 1, between its connections with the draining-pipe and the thermostatic casing; or a check-valve, $c^2$, Fig. 11, may be located about the thermostatic rod $C^3$, near the top of the thermostatic casing, and answer the same purpose. Usually the check-valve is, by preference, so constructed as not to fit snugly to its seat when closed, as it is not necessary to direct all backflow to the draining-pipe, but simply to prevent the flow of a quantity of water from the building to the thermostatic apparatus which would be sufficient to improperly actuate the apparatus in event of the backflowing water being of high temperature. By admitting some of the backflowing water to the thermostatic apparatus by way of the check-valve the emptying of water from the pipe constituting the thermostatic casing is facilitated when the water is cut off.

To insure the rapid emptying of the pipes when the water is cut off by atmospheric pressure upon the tops of the columns of water in the pipes, an air-chamber, D, is secured either directly to the top of each pipe or to the cocks for drawing water when they are located at the upper ends of pipes. The air is compressed in the chambers upon the ascent of water in the pipes, and operates in obvious way to hasten the discharge of the water from the pipes when the supply is cut off.

As shown in Fig. 17, and in connection with the pipe C', Fig. 1, the air-chamber is provided by a hollow knob or bulb of the modified form of plug-valve D' of an ordinary water-supply cock. The air-chamber extends by the passage $d$ to the water-way $D^2$ of the valve, and the vent-opening $d'$, at right angles to this passage, opens communication between the air-chamber and the pipe when the cock is turned to cut off the water. The water way or passage through the pipe C' is larger than that through the nozzle of the cock, and the valve-plug fits down far enough into its seat to properly locate the vent-opening for opening communication between the pipe and the air-chamber, as will readily be understood. When the cock is opened, the water which may have ascended into the lower part of the air-chamber passes out by the nozzle, that end of the way $D^2$, which communicates with the nozzle, being made of greatest diameter, and the lower end of the air-chamber passage being made to flare toward this end of the way, as shown, for the purpose of hastening the escape of water from the air-chamber.

The slide-valve E, having the recess in its under side, serves to close communication between the valve chamber and the waste-opening, to open communication between the outlet and waste openings when the water is cut off, while closing communication between the valve-chamber and outlet-opening, and to open communication by way of the valve-chamber between the inlet and outlet openings when the water is turned on, as in the before-mentioned Patent No. 346,308.

A rocking valve-carrying cam, E', is pivoted by the screw $e$ to the back of the valve-casing, and is provided with the side arm, $e'$, projecting from the front of its lower portion and fitting in a socket in the valve. The upper portion of this cam is formed at its back with the opposite inclines or cam-surfaces $ff'$, and at its front with the side lug, $f^2$. A valve-actuating arm, F, pivoted by the screws $e^2$ at its upper or inner end to the back of the casing, is acted upon by a strong spring, F', so as to cause its outer or lower end to bear downward forcibly upon the cam against either the incline $f$ or the incline $f'$ thereof, according to whether the valve is acting to turn on or cut off the water. The spring F' acts upon the side lug, $F^2$, of the valve-actuating arm F and engages at its lower end with the teat $g$ thereof. At its upper end the spring engages with a teat, $g'$, of the side arm, G', provided at the upper end of the controlling-lever G, which, at its juncture with this side arm, is pivoted in the valve-casing at one side of and close to the top of the valve-chamber by the screw $g^2$. The controlling-lever, as it vibrates about its pivot $g^2$, acts to trip the valve-carrying cam or start it in motion to impart to the valve a slight movement in either direction preparatory to a quick movement of the valve in cutting off and turning on the water, after which tripping action the valve-actuating arm serves, by acting upon the cam, to quickly slide the valve for abruptly and completely cutting off or turning on the water.

It should be understood that the motion imparted to the cam by the vibration of the controlling-lever is sufficient to only partially turn on or cut off the water, and that the cam is by the tripping action of this lever brought into position to be quickly rocked by the actuating-lever to move the valve for completely closing or opening communication between the valve-chamber and the outlet-spring. To enable the lever to perform its function of tripping the cam, or moving it into position to be actuated by the arm F, it is lugged at its lower end, to act upon the lug $f^2$ of the cam, the lugs $h\ h'$ of the lever projecting downwardly upon opposite sides of the cam-lug. (See Fig. 2.) The lug $h'$ is formed upon the under side of a stop-arm, H, of the controlling-lever, and this stop-arm serves to limit the movement of the lever in one direction by coming in contact with the side of the valve-chamber at the inlet-opening thereto.

From the above description it will be seen that when the controlling-lever is operated to move its lower end to a sufficient extent toward the outlet-opening the lug $h'$, by acting on the cam-lug $f^2$, will rock the cam far enough to bring it into a position past its dead-center of movement, (when the cam is on its dead-center its side arm, $e'$, occupies the position in which it is shown dotted at $x$, Fig. 2,) and the actuating-arm, operating upon the incline $f$, will quickly complete the movement of the cam to turn on the water, at which time the side arm, $e'$, is in the position in which it is represented dotted at $x'$. In cutting off the water the controlling-lever moves in the opposite direction to trip the cam, and the actuating-arm operates on the incline $f'$ of the cam. It will be seen that when the cam is at the dead-center of movement the actuating-arm presses upon the peak or juncture of the two inclines of the cam, and that when the valve is at the limit of its movement in either direction this cam extends parallel with and rests upon one or the other of the inclines.

The thermostatic rod $C^3$, by the expansion and contraction or endwise movement of which relatively to the casing B' the valve mechanism is controlled in its operations to cut off and turn on the water, enters at its lower end into the valve-casing by way of the opening $h^2$. A packing-washer, H', and the packing $H^2$ in the cavity of the thermostat-coupling opening $b'$ prevent leaking from the valve-casing by way of the opening $h^2$ for the thermostatic rod. The upper end of this rod enters a cavity in and bears against a perforated threaded plug, I, screwed into the coupling $b$ at the upper end of the thermostatic casing, and a cap-nut, I', is provided, engaging the screw plug. The set of the bearing-plug I may be varied to properly adjust the thermostatic apparatus, as will be obvious. A perforated threaded cap-plug, J, screws into a socket in the cap-nut and confines the packing $j$, to prevent leakage by way of the opening $i$, through which, and through the perforation of the cap-plug, passes the push-rod J', which may be formed either by reducing the upper end of the thermostatic rod or separately therefrom.

The push-rod is shown as separate from the thermostatic rod, and is of smaller diameter than the latter, in order that proper bearing may be afforded against the bearing-plug for the thermostatic rod. By way of the push-rod, which loosely rests upon the thermostatic rod, the thermostatic apparatus may be actuated to turn off the water by hand, as further on to be explained.

As shown in Figs. 1, 3, and 4, the thermostatic rod is jointed at its lower end to the controlling-lever, the side arm, G', of this lever being slotted and the lower end of the rod pivoted in the slot. It will be understood that in event of excessive contraction of the thermostatic rod it will recede from its bearing at top after the limit of movement of the controlling-lever in cutting off the water is reached, and that until this limit is reached the spring F' serves to hold the rod up to its bearing.

The hand-actuated mechanism shown as employed for operating the thermostatic apparatus to turn on the water, as required in event of its having been automatically cut off, is as follows: A lever, K, bearing upon the push-rod J', is connected with the thermostatic casing by means of a forked bracket, K', upon the cap-nut I', and a pin, k, which pivots the lever in the forks of the bracket. The lever simply rests or bears downwardly upon the push-rod, so as by way of this rod to operate with a thrusting action only on the thermostatic rod. At its outer end the lever loosely embraces a controlling-rod, L, between collars L' L', fixed thereto, and this rod is mounted so that it may move endwise and turn in suitable bearing-brackets, m m'. A screw on the controlling-rod works in a fixed female screw, M, and the controlling-rod is provided with hand-wheels N N, for turning it, and consequently moving it endwise as it works in the fixed screw. These hand-wheels are adjacent to cocks n n, one of which is shown as applied to the thermostatic casing. A torsional spring, O, connected with the controlling-rod and one of the brackets, (the bracket m',) acts with a tendency to resist the movement of the controlling-rod in the direction for turning on the water, and to turn this rod to restore it to the position it occupied when the water was cut off after each actuation of it to turn on the water. Obviously, more than one of the springs may be used. A second rod, P, geared by beveled gears p p with the controlling-rod, is mounted to turn in bearings in one of the arms of the bracket m' and in other suitable brackets, only one, p', of which is shown. This rod P has a hand-wheel, Q, near each cock, which may be adjacent to it, so that the water may be turned on and drawn conveniently. The turning rods and their hand-wheels are to be provided, it will be understood, in proximity to all the cocks in the pipes supplied with water, and it is obvious that instead of having the hand-wheels the rod P might be arranged higher and be provided with cranks having hanging cords for operating it to turn the controlling-rod. The controlling-rod is connected with its gear p by means of a spline or feather, $g^4$, engaging a groove in the hub of the gear, so that the rod may move endwise while turning the gear.

From the above description it will be seen that with the thermostatic apparatus properly adjusted the operation will be as follows: The water supplied passes to the thermostatic casing, and so long as the temperature of the water in contact with the thermostatic rod is above the point at which it would be liable to freeze it remains turned on. When, however, the water becomes sufficiently chilled, the contraction of the thermostatic rod results in shutting off the supply and the pipes are drained. When the water is turned on by hand, its contact with the thermostatic rod will usually soon sufficiently expand it to render unnecessary a long-continued operation of the hand-actuated mechanism in drawing water, as the temperature of the water when first admitted from under ground is much higher during cold weather than it afterward becomes. When the current through the thermostatic casing ceases and the water again chills sufficiently, it is automatically shut off.

As next to be explained, by reference to Figs. 11 to 15, inclusive, my improvements may be somewhat modified without departure from my invention. The water-way B, for making communication between the valve-chamber and the thermostatic casing, may be formed with the valve-casing, and a washer, R, for confining the packing about the lower end of the thermostatic rod, be formed with the flange R', having the side recess, r, for the passage of the water to the thermostatic casing from the way B. The draining-pipe communicates at its upper end with the main service-pipe by the coupling b, which is sufficiently elongated for this purpose, instead of communicating with this pipe by a coupling separate from that by which it communicates with the thermostatic casing, and instead of the push-rod operating upon the thermostatic rod, as before, a threaded push-rod, S, passing through the cap-plug, is screwed into the bearing-plug, and the thermostatic rod may be forced downward to turn on the water by turning this screw-rod. The rocking valve-carrying cam is formed with the curved lug S', instead of the before-described lug $f^2$, and has the curved cam-surfaces s s' in lieu of the inclined cam-surfaces f f'. The thermostatic rod is not pivoted at its lower end to the controlling-lever, but simply abuts against the side arm at its top, and the lugged lower end of the lever is also of different formation, it being provided with a single lug, T, with the inclines t t' at its opposite sides, and projecting into the recess formed by the curved lug of the cam, so as to act by its opposite inclines upon the opposite extremities of the curved lug to trip the cam and start the valve in turning on and cutting off the water. The modified actuating-lever is of pawl-like formation, being curved and bearing only at its point u upon the cam-surfaces s s'. In the operation of this modified valve mechanism in turning on the water that end of the curved lug of the cam next the outlet-opening is acted upon by the incline t of the lug of the controlling-lever, and the cam is moved against the force exerted by the actuating-arm until the curved surface s of the cam is presented to the point of the actuating-arm, at which time the arm acts to quickly complete the movement of the cam to turn on the water. In shutting off the water, the incline t' of the controlling-lever lug acts upon that end of the lug of the cam next the inlet-opening to start the valve, and when the curved surface s' of the cam is presented to the actuating-arm the completion of the movement of the valve to shut off the water is quickly accomplished.

Instead of the valve mechanism herein described. that shown in the above-mentioned Patent No. 346,308 may be employed in connection with other features of my present invention; and, if preferred, the controlling-rod may be actuated wholly by hand by omitting the torsional spring.

I claim as of my own invention—

1. The combination of the valve-casing having the inlet-opening for connection with the supply-pipe, and provided with the outlet, waste, and thermostat-coupling openings, the valve mechanism within the casing, the thermostatic casing coupled to the valve-casing, the thermostatic rod projecting into the valve-casing and acting upon the valve mechanism, the water-way communicating at its opposite ends with the thermostatic casing and the outlet-opening of the valve-casing, and the coupling for connecting the thermostatic casing with the main service-pipe, to which the water passes from the supply-pipe through the valve-casing, the water-way, and the thermostatic casing, substantially as and for the purpose set forth.

2. The combination of the valve-casing having an inlet-opening, an outlet-opening, a waste-opening, and a thermostat-coupling opening, the valve mechanism within the casing, the thermostatic casing coupled to the valve-casing, the thermostatic rod projecting into the valve-casing and acting upon the valve mechanism, the water-way communicating at its opposite ends with the thermostatic casing and the valve-casing, the main service-pipe connected with the thermostatic casing, the draining-pipe communicating at its opposite ends with the water-way and the main service-pipe, and the check-valve for directing the backflow of the water to the draining-pipe, substantially as and for the purpose set forth.

3. The combination of the valve casing having inlet and outlet openings, the slide-valve, the rocking valve-carrying cam having the opposite cam-surfaces and the side lug, the valve-actuating arm provided with the side lug and operating upon said cam-surfaces, the controlling-lever having the side arm at its upper end and lugged at its lower end to act upon the side lug of the valve-carrying cam, and the spring connected at its opposite ends with the side lug and the side arm of the actuating-arm and the controlling-lever, respectively, substantially as and for the purpose set forth.

4. The combination of the valve-casing having inlet, outlet, waste, and thermostat-coupling openings, the controlling-lever pivoted at its upper end in the casing and provided with the side arm, and having the stop arm and lugs at its lower end, the thermostatic apparatus having the rod acting upon the side arm of the controlling-lever, the valve-actuating arm provided with the side lug, the spring connected with said side lug and with the side arm of the controlling-lever, the recessed slide-valve, and the rocking cam provided with the side arm engaging the valve, the side lug acted upon by the controlling-lever, and the cam-surfaces acted upon by the valve-actuating arm, substantially as and for the purpose set forth.

5. The combination of the valve-casing having the inlet, outlet, and thermostat-coupling openings, the thermostatic casing, the water-way communicating at its opposite ends with the valve-casing and the thermostatic casing, the valve mechanism, the thermostatic rod acting on the controlling-lever of the valve mechanism, the adjustable perforated bearing-plug for the thermostatic rod, the perforated cap-nut, the cap-plug and packing, and the push-rod operating with a thrusting action only on the thermostatic rod, substantially as and for the purpose set forth.

6. The combination of the valve-casing having the inlet, outlet, and thermostat-coupling openings, the valve mechanism, the thermostatic casing, the thermostatic rod acting on the controlling-lever of the valve mechanism, the adjustable perforated bearing-plug for the thermostatic rod, the perforated cap-nut provided with the bracket, the push-rod operating with a thrusting action only on the thermostatic rod, the lever pivoted to said bracket and bearing upon the push-rod, the controlling-rod provided with the screw and having the collars between which it is embraced by the lever, the bearings for the controlling-rod, the fixed screw with which the screw of the controlling-rod engages, the hand wheel (or wheels) for turning the controlling-rod, and the torsional spring acting on the controlling-rod with a tendency to resist its moving in the direction for turning on the water, substantially as and for the purpose set forth.

7. The combination of the valve-casing having the inlet, outlet, and thermostat-coupling openings, the valve mechanism within said casing, the thermostatic casing, the thermostatic rod acting upon the valve mechanism, the perforated bearing-plug for the thermostatic rod, the perforated cap-nut, the push-rod, the lever acting on the push-rod, the turning endwise-moving controlling-rod engaged by said lever, the gear turning with the controlling-rod, the turning rod geared with the controlling-rod, the main service-pipe, the pipe (or pipes) connected therewith, and the hand-wheels on the controlling-rod, and the rod geared therewith adjacent to the cocks of the respective pipes, substantially as and for the purpose set forth.

8. The combination of the valve-casing having inlet, outlet, waste, and thermostat-coupling openings, the valve mechanism within the casing, the thermostatic casing coupled to the valve-casing, the thermostatic rod projecting into the valve-casing and actuating the valve mechanism, the main service-pipe, the pipe C', connected therewith, and the cock at the upper end thereof provided with the plug forming the hollow bulb constituting an air-chamber communicating by the passage $d$ with the water-way of the cock, and having the vent-opening $d'$ at right angles with this passage for communicating with the pipe, substantially as and for the purpose set forth.

In testimony whereof I have hereunto subscribed my name.

EDWIN A. NEWMAN.

Witnesses:
JOS. FORREST,
JOS. R. EDSON.